US006317742B1

(12) United States Patent
Nagaratnam et al.

(10) Patent No.: US 6,317,742 B1
(45) Date of Patent: Nov. 13, 2001

(54) METHOD AND APPARATUS FOR CONTROLLING SOFTWARE ACCESS TO SYSTEM RESOURCES

(75) Inventors: Nataraj Nagaratnam, Syracuse, NY (US); Steven B. Byrne, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/780,823

(22) Filed: Jan. 9, 1997

(51) Int. Cl.$^7$ .................................................. G06F 17/30
(52) U.S. Cl. ............................ 707/9; 707/10; 713/200
(58) Field of Search ........................... 709/300, 301, 709/303, 108; 713/200; 711/164; 707/6, 9, 103, 10; 395/425; 717/11

(56) References Cited

U.S. PATENT DOCUMENTS

| | | | | |
|---|---|---|---|---|
| 5,394,534 | * | 2/1995 | Kulakowski et al. | 395/425 |
| 5,720,033 | * | 2/1998 | Deo | 713/200 |
| 5,802,590 | * | 9/1998 | Draves | 711/164 |
| 5,848,412 | * | 12/1998 | Rowland et al. | 707/9 |
| 5,878,258 | * | 3/1999 | Pizi et al. | 709/302 |
| 5,970,477 | * | 10/1999 | Roden | 705/32 |
| 6,049,671 | * | 4/2000 | Slivka et al. | 395/712 |

OTHER PUBLICATIONS

Jason Levitt, "Browser bout: a split decision", Information-Week n597, p. 106(5), 1996.*

Sun Microsystems, JAR Guide, 1996.*

Sun Microsystems, Manifest Format, 1996.*

* cited by examiner

Primary Examiner—Majid A. Banankhah
(74) Attorney, Agent, or Firm—Beyer Weaver & Thomas

(57) ABSTRACT

Methods, systems, and software for installing and operating selected software applications on a client computer that is in communication with a server computer on a computer network are described. In one aspect of the present invention, a method for controlling the degree of access to operating system resources for a software program running on a computer that is running said operating system is provided. The degree of access to the operating system resources is defined for the software program, and at least one file including instructions for executing the software program is loaded on the computer from the server computer. The file is examined to determine the degree of system-level access available to the software program when the software program is being executed by the computer. The software program is executed, and a program instruction associated with the software program is intercepted when the software is being executed on the computer. A determination is then made to determine if the program instruction includes an operation that is outside of a degree of system-level access that is available to the software program, and if it is determined that the software program has permission to access system-level resources associated with the computer that are within the degree of system-level access available to the software, the program instruction is executed.

36 Claims, 10 Drawing Sheets

METHOD AND APPARATUS FOR CONTROLLING SOFTWARE ACCESS TO SYSTEM RESOURCES

BACKGROUND OF THE INVENTION

1. Field of Invention

The present invention relates generally to methods and apparatus for controlling the access to computer resources by software running on a computer. More specifically, the present invention relates to methods and apparatus for controlling the access to system resources on a client computer by software downloaded to the client computer from a server computer.

2. Background

Prior to the rise of the personal computer, computer users were limited to operating software that ran on large, mainframe computers using terminals that typically included a keyboard for entering data and commands and a video display device (or printer) for viewing output. Although mainframes provided very powerful computing platforms, they suffered from serious drawbacks. In particular, mainframes were expensive to install and operate and they required all users to be connected directly to the mainframe through a terminal, which limited access to the mainframe for many people. In addition, users had very limited control over their computing environments, usually having to adapt their work styles and problems to suit the software and administration of the mainframe computer.

Beginning in the late 1970's personal computers began to overtake mainframes as the dominant computing platform for both personal, business, and scientific uses. For single users, personal computers often could provide the same computing speed as the older mainframes that had to accommodate many processing jobs simultaneously. In addition, software that ran on the personal computers became more "user-friendly," thereby allowing computer users to adapt both the computer and the software to suit their particular computation needs. The release from requiring a connection from a terminal to a mainframe allowed personal computers to be located just about anywhere within an organization or at home. This capability further assured the dominance of the personal computer over the mainframe as computing power could be located at sites where it was needed. No longer did users have to tailor their operations around large, expensive, finicky mainframe computing centers.

As the computing power and data storage capacities of personal computers exploded throughout the 1980s, the dominance of the personal computer seemed to be assured. As the 1980s drew to a close, however, a new phenomenon began to emerge which appears likely to overtake the personal computer revolution of the past two decades. Today, ever increasing numbers of personal computers are linked to each other through high speed data networks. The most popular network currently is the "Internet," which is the network comprising various business, academic, and personal computer sites across the globe. The popularity of the Internet, and, more particularly, that aspect of the Internet referred to as the "World Wide Web," has prompted many organizations to form internal computer networks, which are often referred to as "intranets." This interest in network computing has been sparked by a combination of high speed data networks and increasingly sophisticated network servers, routers and other devices which allow many independent personal computers to communicate efficiently.

The attractiveness of the World Wide Web stems in part from its highly visual character, the same factor that played a large role in the rise of the personal computer and its dominance over the mainframe. Typically, the World Wide Web is organized into various "web sites" which typically comprise a server that transmits data to a client computer running a "browser." The browser is software that provides a user with a window and various controls through which data from the server can be viewed and navigated. A particularly useful feature of World Wide Web data is its ability to be linked through hypertext commands such that users can quickly navigate from one document to another and even from one web site to another through very simple intuitive commands such as the activation of a mouse button. Using the World Wide Web, users can view and/or download text, graphics and hear sounds from sites all over the globe. In addition users can also download new software, or software capable of modifying programs already installed on the client computers.

These same features available to users of the World Wide Web on the Internet can also be provided to users of a local network through an "intranet", a non-public computer network that includes clients and servers arranged analogously to the Internet. This capability has received increasing attention from many organizations as information useful to employees carrying out their assignments can be distributed quickly throughout the network to personal computers within the organization. In particular, many organizations are utilizing intranets to provide access to databases and custom software programs for individuals in the organization using such intranets. For example custom software applets created using the Java™ programming language (available commercially from Sun Microsystems of Mountain View, Calif.), can be operated in conjunction with software and data already installed on the remote computer which is either external or internal to the intranet to provide users access to data and software specific to their job tasks without the difficulties associated with disseminating and maintaining many copies of special-purpose software as has been done traditionally.

It is often desirable for software distributed through a secure intranet to have full access to the system resources of the client computer; whereas software distributed over less secure networks external to the intranet system generally are allowed little or no access to system resources, such as file moving capabilities, as such software cannot always be trusted. For example, some software applications include "Trojan horse" functions that install computer viruses on the host computer. Other software application may copy, alter, or delete critical data from the host computer and even forward that data to another computer system surreptitiously. Unfortunately, there is no viable method or apparatus to enable trusted software to access certain resources while restricting other software from accessing the same resource. Users are therefore left with a trade-off between enabling all software (trusted or suspect) access all system resources or limiting the access of all software in an effort to preserve the security of the client system.

Thus, it would be of great benefit to computer users, and especially computer users within organizations in which multiple computer users are connected through a computer network, to provide methods and systems for controlling resource access for both information and software over the network so that the above-described problems associated with highly decentralized computer networks can be mitigated. As will be described here and below, the present invention meets these and other needs.

SUMMARY OF THE INVENTION

The present invention addresses the above-described difficulties in managing software distribution across networked computers by providing, in one aspect, a method, system, and software for controlling the access to server resources by selected software applications on a first computer acting as a client computer that is in communication with a second computer acting as a server computer on a computer network.

In one aspect of the present invention, a method for controlling the degree of access to operating system resources for a software program running on a computer. The degree of access to the operating system resources is defined for the software program, and at least one file including instructions for executing the software program is loaded on the computer. The file is examined to determine the degree of system-level access available to the software program when the software program is being executed by the computer. The software program is executed, and a program instruction requesting access to secure resources associated with the software program is intercepted when the software is being executed on the computer. A determination is then made to determine if the program instruction includes an operation that is outside of a degree of system-level access that is available to the software program, and if it is determined that the software program has permission to access system-level resources associated with the computer that are within the degree of system-level access available to the software, the program instruction is executed.

In another aspect of the present invention, a method for controlling the degree of access to system resources for a software program running on a client computer that is running the operating system, where at least some of the operating system resources reside on a server computer that is coupled with the client computer, is provided. The degree of access to the operating system resources for the software program is defined, and at least one file including instructions for executing the software program on the client computer is loaded. The file is examined to determine the degree of system-level access available to the software program when the software program is being executed by the client computer. The software program is executed on the client computer, and a program instruction associated with the software program is intercepted when the software program is being executed on the client computer. A determination is made regarding whether the program instruction includes an operation that is outside the degree of system-level access available to the software program, and when it is determined that the software program has permission to access system-level resources that are within the degree of system-level access available to the software program, the program instruction is executed.

In one embodiment, determining if the program instruction includes an operation that is outside the degree of system-level access available to the software program involves validating an identifier associated with the software program. In such an embodiment, executing the program instruction involves determining if the system-level resources being accessed by the program instruction are protected system-level resources. In another embodiment, an identifier that identifies the server computer in order to determine if the computer has permission to access system-level resources which reside on the server computer is validated.

In still another aspect, the present invention provides a computer system for controlling the degree of access to operating system resources. A first computer which runs an operating system and is coupled with at least one memory device which holds a software program that runs on the first computer is arranged to define the degree of access to the operating system resources that the software program has. The first computer is also arranged to load at least one file that includes instructions for executing the software program on the first computer, and to examine the file to determine the degree of system-level access available to the software program. The first computer is further arranged to execute the software program on the first computer and to determine if a program instruction associated with the software program includes an operation that is outside of the degree of system-level access available to the software program.

In still another aspect, the present invention provides a computer-readable medium with computer-readable program code devices configured to cause a computer to control the degree of access to operating system resources for a software program running on the computer which is also running the operating system. Code devices are also configured to define the degree of access to operating system resources for the software program, to load at least one file including instructions for executing the software program on the computer; and to examine at least one file to determine the degree of system-level access available to the software program when the software program is being executed by the computer. Code devices are further configured to intercept a program instruction associated with the software program when the software program is being executed on the computer and to determine if the program instruction includes an operation that is outside the degree of system-level access available to the software program. In one embodiment, the computer readable medium comprising computer-readable program code devices includes code devices arranged to determine whether the request is a request to access a protected system-level resource. In another embodiment, the software program is a Java™ applet.

These, and other aspects and advantages of the present invention, will become apparent when the Description below is read in conjunction with the accompanying Drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE DRAWINGS

Certain embodiments of a method and apparatus for controlling the access by applets to system resources will be described below making reference to the accompanying drawings.

Figure 1A:
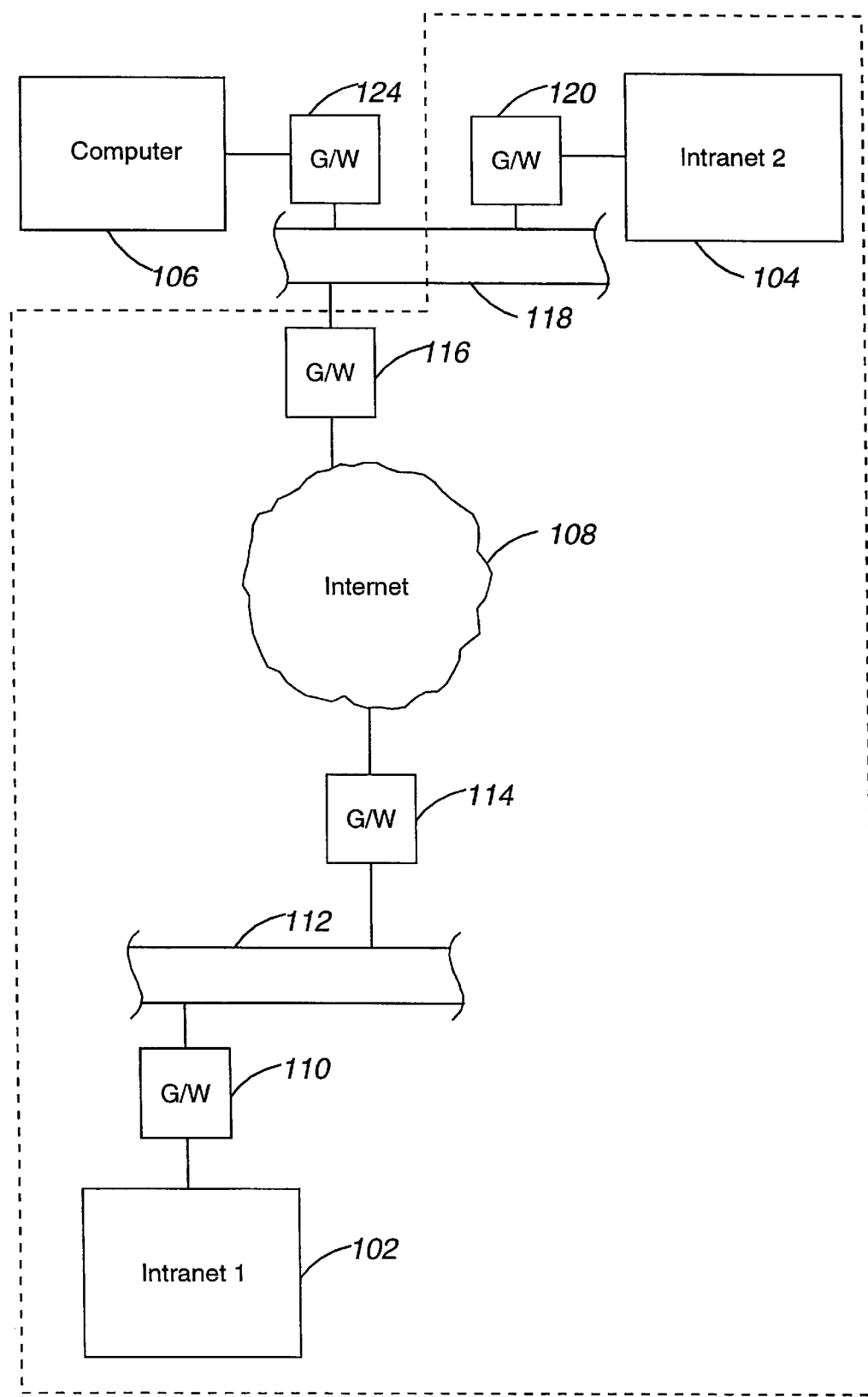
FIG. 1a is a diagrammatic representation of a wide area computer network in which both users and intranets are coupled by a computer network through the Internet.

An illustration of one network in accordance with the present invention is provided in FIG. 1a. Included in the network illustrated in FIG. 1a are intranets 102 and 104 and an individual external computer shown at 106. The structure of intranets 102 and 104 is described in greater detail below with respect to FIG. 1b. Both the intranets and the user are connected to the computer network through a variety of computer gateways ("G/W"). In some embodiments, the computer network includes the Internet. Referring to FIG. 1a more specifically, intranet 102 is coupled with intranet 104 and user 106 through the Internet which is shown generally at 108. The connection between intranet 102 and the Internet 108 is provided first through a gateway 110 which is coupled with intranet 102 and a "backbone," or high capacity dataline 112. Data from a high capacity line 112 is routed through gateway 114 through the Internet 108 which data passes through a second gateway 116 and into high capacity dataline shown at 118. As will be appreciated by those of skill in the computer network arts, dataline 118 can be the same as dataline 112, or may represent a separate backbone to which various other individuals, or users, and networks are coupled.

Data that travels from intranet 102 through the Internet 108 and over high speed dataline 118 passes through gateway 120 to intranet 104 or through gateway 124 to user 106. Thus, according to the illustrated embodiment, data can be passed among user 106, intranet 104, and intranet 102. In particular, the data may travel through the Internet 108 as just described, or may pass across backbone 118 between user 106 and intranet 104. In some embodiments, intranet 104 and intranet 102 can be coupled directly through network configurations known to those of skill in the art as "extranets". Extranets are network arrangements in which a given network or individual is coupled with a remote network through a dedicated data connection. This connection may include data that is routed through the Internet, as illustrated in FIG. 1a, or may be a direct data feed, such as through an ISDN or T-1 dataline. Various configurations in addition to methods and materials for establishing such configurations will be apparent to those of skill in the computer network and telecommunications arts.

Figure 1B:
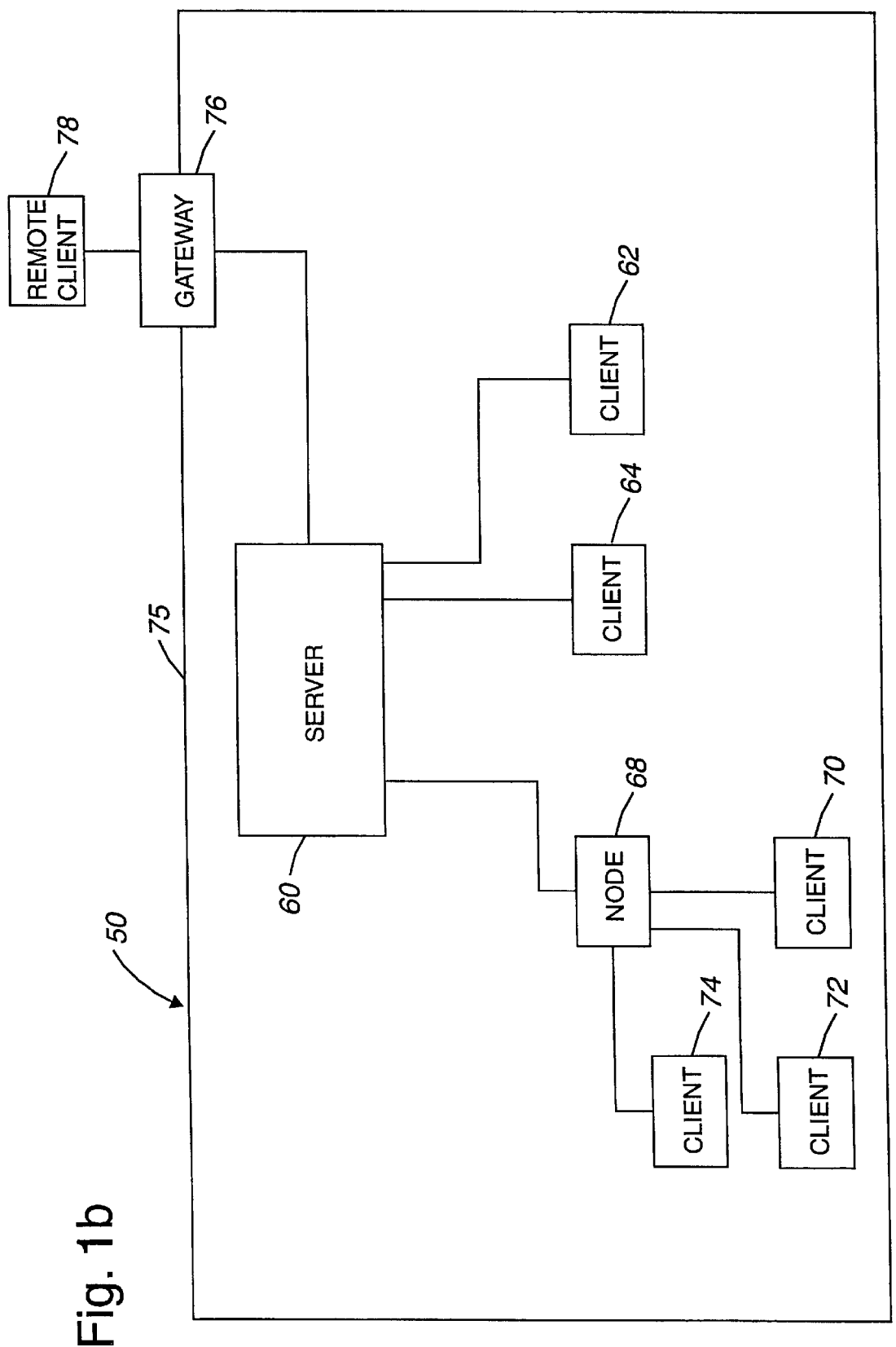
FIG. 1b is a diagrammatic representation of a conventional intranet system.

One embodiment of an intranet, such as illustrated in FIG. 1a at 102 or 104, is provided in FIG. 1b at 50. A typical intranet 50 includes a server 60 which is coupled with clients 62 and 64. In addition, server 60 can be coupled to other client computers such as shown at 70, 72, and 74 through a router, hub or similar data transfer device such as shown at node 68. In addition, remote clients (not shown) can be connected to server 60 either through a direct line or through the use of telephone lines using, e.g., a modem or similar device. In some cases, access to intranet 50 will be controlled to a high degree by a "firewall" configuration which is illustrated by the box 75. The establishment of communications from users external to the firewall, such as remote client 78, can be achieved by traversing a gateway which allows access to the protected server. Such a gateway is illustrated at 76.

Typically, a server provides data and software that is accessible to the various clients which are in communication with the server, either directly or through a device such as a router. The construction, maintenance, and operation of the server, router, and various client machines will be well known to those of skill in the art. In some particular embodiments, server 60 will be configured to provide data that is compatible with browser software such as that used to view data on the World Wide Web. Specifically, the data provided by server 60 will be in the form of pages of data that can be examined using typical browser software. In one embodiment, the server and clients are configured to exchange not only data but computer software in the form of "applets," such as those written in the Java™ programming language available from Sun Microsystems of Mountain View, Calif. "Applets" as used herein are software programs that are configured to be passed from a source computer, typically a server, to a client machine and run in conjunction with software already installed on the client. In one embodiment, the software with which the applet runs is the above-described browser software. Typically, applets provide additional functionalities to browser software by performing various computational tasks which the browser software itself is not configured to perform. Thus, users who download applets can provide the browser software with additional functionalities that are not otherwise available to the browser software. Such additional capabilities can include, e.g., custom interfaces to a database.

In general, a client, as for example client 62, calls into server 60 using a user agent, or a browser. User agents include, but are not limited to, HotJava™, available from Sun Microsystems, Incorporated of Mountain View, Calif., and Netscape, available from Netscape Communications Corporation, also of Mountain View, Calif. In one embodiment, the user agents generally includes a processing engine which executes the applet code, and a security manager used in the determination of whether an applet has access to certain system resources. Examples of such a security manager are provided herein below.

According to one embodiment, a server, located either on the Internet or within an intranet, provides class libraries which contain class files that define an applet. One example of such a class library is a Java™ class library. Specifically, a server can contain the class files that make up the applet, and the particular Web pages including HTML code that references the applet.

According to one embodiment of the present invention, applets are instantiated from class files that are downloaded from a source computer, or a server, to a client machine. The class files may be grouped together into an archive file. Further, an archive file can be digitally signed, or otherwise marked, such that the origin of an applet created from the archive file can be reliably determined. The signature of an archive file can then be verified in order to determine which system resources are accessible to the machine on which the applet is executing. The use of signatures enables the access to system resources of the client machine by the applet to be controlled, e.g., by reference to the security status of the server from where the applet originated. By way of example, an applet executing on one client may have different access privileges than the same applet executing on a second client by virtue of the fact that the permissions associated with the applet on each client may be different. This resource access control therefore enables applets associated with secure machines, e.g., machines in the same intranet as the machine which contains the resources, to have more access to resources than applets associated with unsecure machines, e.g., machines on the Internet.

Figure 2A:
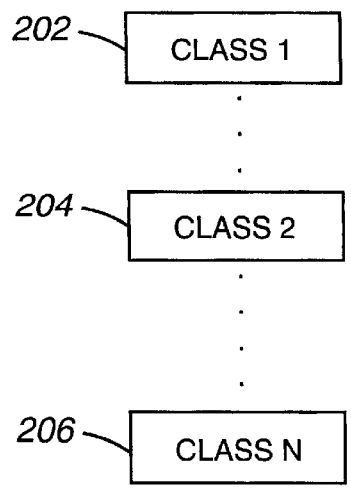
FIG. 2a is a diagrammatic representation of a collection of class files in accordance with an embodiment of the present invention.

FIG. 2a is a diagrammatic representation of a collection of class files in accordance with an embodiment of the present invention. The format of the collection of class data files, which is generally used on a server, is not arranged to accept signatures. That is, each class file typically defines a class residing on a server. The format is such that the collection includes any number of classes, as for example class "1" 202, class "2" 204, and class "N" 206. A class may be defined as a software construct that defines data and methods, or sequences of statements that operate on the data, which are specific to any applets that are subsequently constructed from that class. In other words, as previously stated, an applet may be constructed by instantiating a previously defined class. It should be appreciated that a single class may be used to construct many applets.

The execution of an applet usually entails requests, or commands, to access system resources. While an applet may contain instructions to access many different system resources, due to security concerns, an applet is either allowed access to all of the specified system resources or access to none of the specified system resources under present design restraints. As discussed above, this "all-or-nothing" approach to system resource access is often undesirable in that an applet running within an intranet system, for example, is "trusted," e.g., of known origin, while an equivalent applet running externally to the intranet system is considered to be unsecure. As the applet running within the intranet system and the equivalent applet running externally are typically given the same access privileges to system resources, in order to maintain the security of the intranet system, the applets are generally given no access privileges.

The ability to selectively control applets from accessing resources enables a user within an intranet system to restrict access to resources on an individual applet basis. Including a "signature," or an identifier, with class files that are used to instantiate an applet is one method which serves to enable an intranet organization to selectively control applets. Signing, or marking, class files such that it is possible to determine where the class files originated enables an intranet system to determine the appropriate access privileges associated with an applet instantiated from the class files. In addition, signing class files further enables a determination to be made regarding whether a class file has been tampered with. An archive file structure which permits a group of class files to be digitally signed will be described below with respect to FIG. 2b.

By providing an archive file which can be digitally signed, it becomes possible to enable an applet, either internal and external to an intranet system, that is constructed from the class files associated with the archive file to access selected system resources within the intranet system. Checking the digital signature of the archive file makes it possible to determine whether a given applet has been tampered with, and which computers have signed the applet. As such, access privileges may be allocated based upon whether the applet originated from a secure, or trusted, host or from an unsecure host. In addition, in some embodiments, the allocation of access privileges enables users to decide which hosts are to be trusted and which are not to be trusted.

Figure 2B:
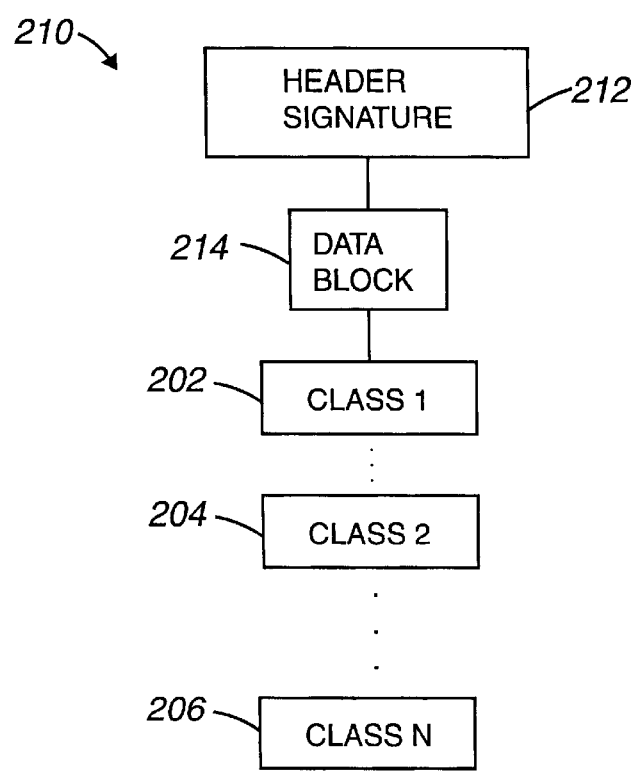
FIG. 2b is a diagrammatic representation of an archive file data format in accordance with an embodiment of the present invention.

FIG. 2b is a diagrammatic representation of an archive file data format in accordance with an embodiment of the present invention. In the described embodiment, the archive format is a Java™ archive (JAR) format. Archive, or archive file, 210 includes a header signature 212 which is the signature that is typically used by a user agent to verify the validity of archive 210 and to determine the levels of access available to archive 210. In general, header signature 212 is a digital signature which may be a part of a general header that contains other information which information includes, but is not limited to, information corresponding to the size of the archive. Archive 210 has any number of associated classes, as for example class "1" 202, class "2" 204, and class "N" 206, from which applets and associated objects are instantiated.

Additionally, archive 210 may have associated data blocks, as for example data block 214. Data block 214 may contain images, text, or any arbitrary data that is considered to be a part of archive 210. In one embodiment, data block 214 may contain a text string that describes classes 202, 204, and 206 that are associated with archive 210. It should be appreciated that in other embodiments, archive 210 may not include a data block.

Figure 3A:
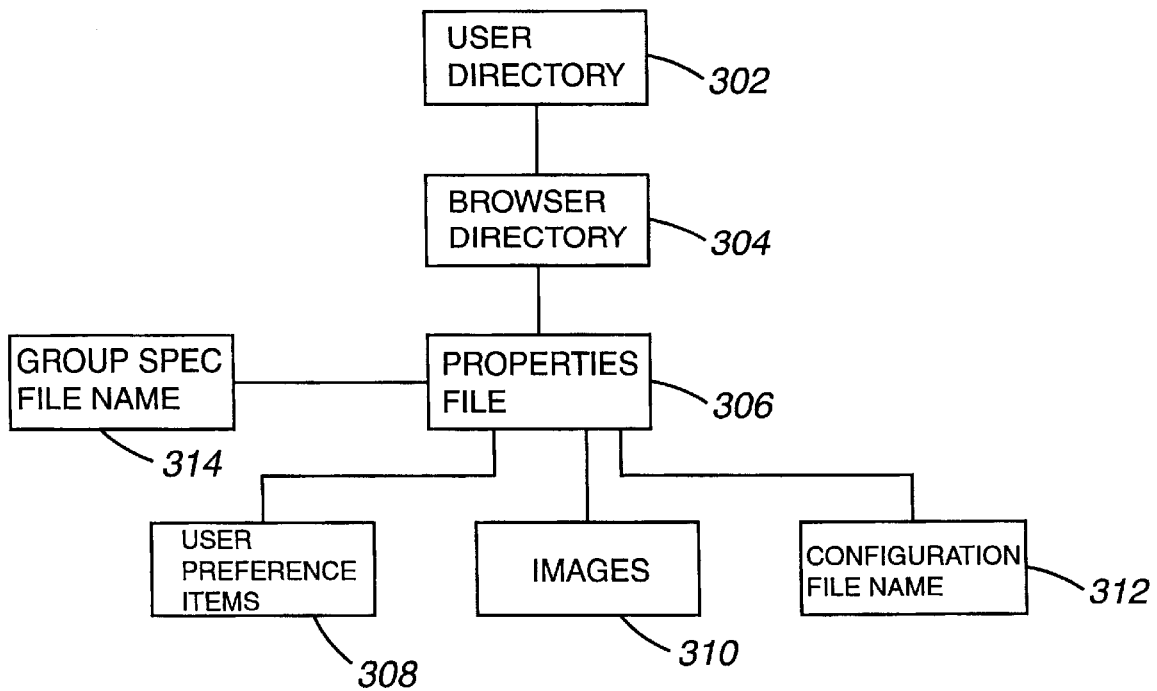
FIG. 3a is a diagrammatic representation of a client-side directory structure in accordance with an embodiment of the present invention.

Referring next to FIG. 3a, an embodiment of a client-side directory structure will be described in accordance with the present invention. A user who makes a request to access a resource through a client generally interfaces with a user directory 302. User directory 302 has an associated browser directory 304 which contains information relating to a browser, or a user agent. The browser may be any suitable browser, as for example the HotJava™ browser as mentioned above. Browser directory 304 includes a properties file 306 that is appropriate to the request made by the user. Properties file 306 typically includes user preference items 308 which are generally browser specifications that arc provided by the user. These specifications may include, but are not limited to, data relating to browser set-up and behavioral properties associated with the browser.

Properties file 306 further includes information that is relevant to the particular request made by the user. By way of example, such information can include an images data block 310, a configuration file name 312, and a group specification file name 314. In one embodiment, images data block 310 includes data file names, i.e., strings, which identify any images that are associated with the request. A configuration file name 312 is a string that identifies a configuration file which is used to facilitate the mapping of a requested resource to associated security descriptors. One example of a configuration file will be described below with reference to FIG. 3b. Group specification ("spec") file name 314 is a string which identifies a group specification file, as will be described below with respect to FIG. 3c.

Figure 3B:
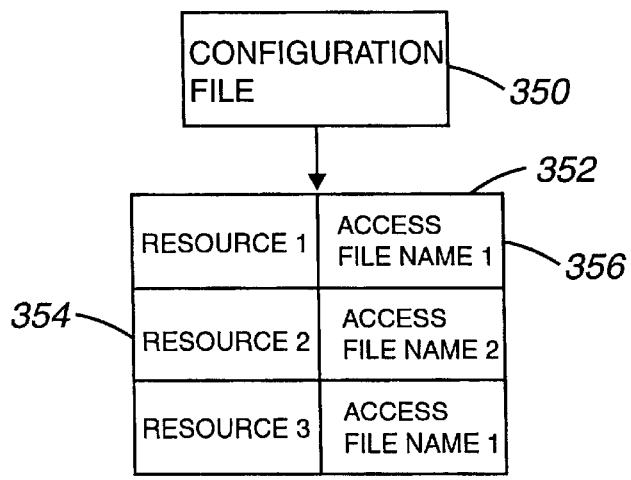
FIG. 3b is a diagrammatic representation of the structure of a client-side configuration file in accordance with an embodiment of the present invention.

FIG. 3b is a diagrammatic representation of the structure of a configuration file in accordance with an embodiment of the present invention. Configuration file 350 is an example of a configuration file identified by configuration file name 312 as mentioned above with respect to FIG. 3a. Configuration file 350 includes a table 352 which associates resources 354 on a server, i.e., a server which the client wishes to access, with corresponding access file names 356. That is, table 352 associates an entry in the resources "column" 354 with a corresponding entry in the access file names "column" 356. Resources 354 are generally classifiers which identify various system resources, as for example files, hosts, and socket numbers. Access file names 356 identify corresponding access files which contain security descriptors and other information that is relevant to the control of access to system resources with which access files are associated. The structure of an access file will be described in more detail below with reference to FIG. 3c. It should be appreciated that due to the fact that more than one resource 354 may share the same security descriptor, access file names 356 and, therefore, access files, may be associated with more than one resource 354.

Figure 3C:
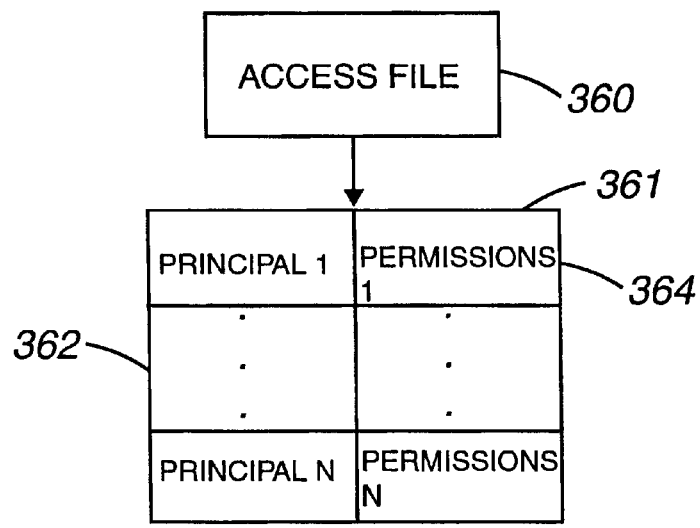
FIG. 3c is a diagrammatic representation of the structure of a client-side access file in accordance with an embodiment of the present invention.

Referring next to FIG. 3c, the structure of an access file will be described in accordance with an embodiment of the present invention. Access file 360 generally includes a table 361 which associates principals 362 with permissions 364. Principals 362 may be individual hosts or groups of hosts. By way of example, "java.com" may be an individual host, i.e., a server, which is a principal 362. Alternatively, "java.com" and "sun.com" may form a principal 362 that is a group. In some embodiments, principals 362 can also be the signers of particular archives. Permissions 364 provide groupings of security descriptors. That is, permissions 364 are groupings of security descriptors which designate the resources that principals 362, with which permissions 364 are associated, have access.

Figure 3D:
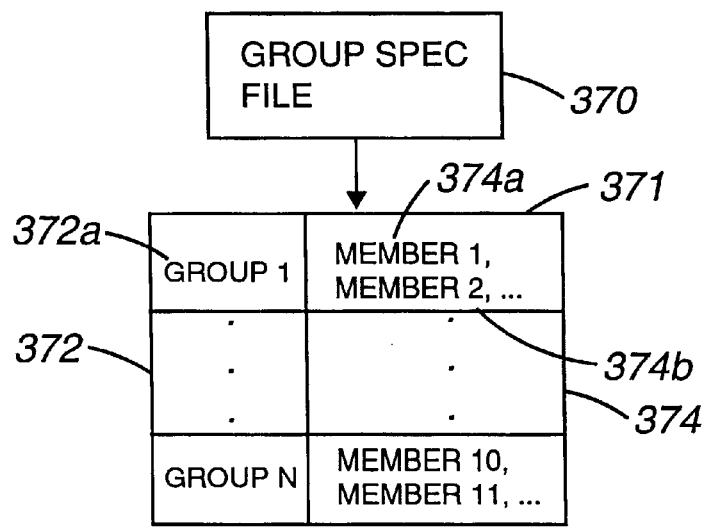
FIG. 3d is a diagrammatic representation of the structure of a client-side group specification file in accordance with an embodiment of the present invention.

FIG. 3d is a diagrammatic representation of a group specification ("spec") file format in accordance with an embodiment of the present invention. As mentioned above, the group specification file name 314 of FIG. 3a identifies a group specification file, as for example group specification file 370. Group specification file 370 includes a table 371 that associates group names 372 with any number of members 374. Group names 372 are essentially identifiers that may be used to identify a group of member 374. By way of example, a group name, as for example group "1" 372a, may be associated with any number of members, as for example member "1" 374a and member "2" 374b. It should be appreciated that a member, as for example member "1" 374a, may be associated with more than one group name 372.

Figure 4:
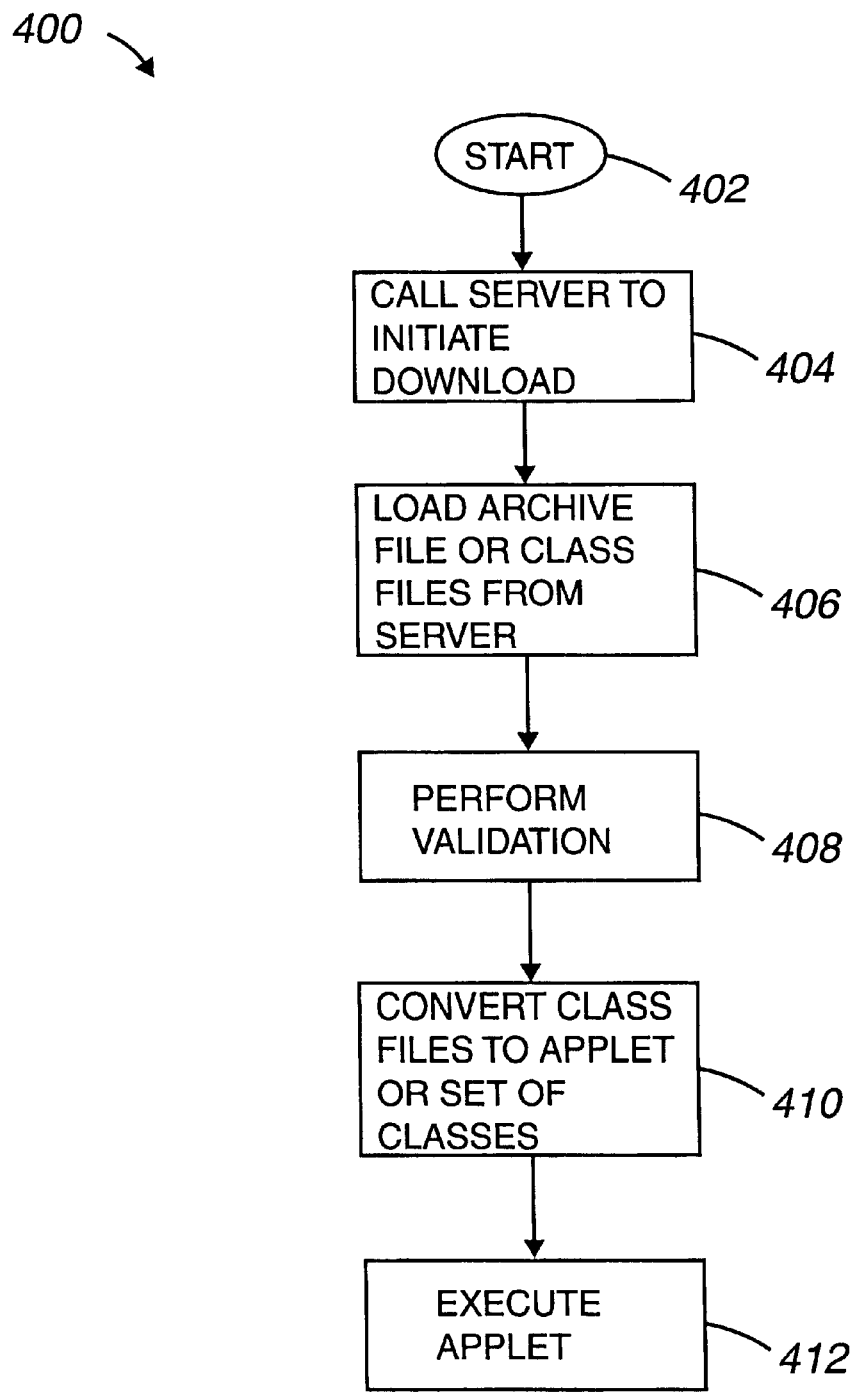
FIG. 4 is a process flow diagram which illustrates a method of executing a request to access a resource in accordance with an embodiment of the present invention.

FIG. 4 is a process flow diagram which illustrates a method of executing a request to access a resource in accordance with an embodiment of the present invention. The process begins at 402 and in a step 404, a call is made from a requesting client, e.g., client 74 of FIG. 1b, to a server, e.g., server 60 of FIG. 1b, to initiate the download of either at least one class file, as described above with respect to FIG. 2a, or an archive file, as described above with respect to FIG. 2b. The request is received on the server in response to a client call made through a user agent, i.e., a browser, as for example a HotJava™ browser or a Netscape Navigator browser as previously mentioned. The initiation of the downloading of either at least one class file or an archive file occurs in response to a request to access a resource and, hence, is a call to execute an applet. In one preferred embodiment, the archive file is a JAR file.

In a step 406, either the archive file is loaded or the class files are loaded from the server into memory associated with the requesting client. In general, class files are loaded if the classes are not in an archive file, e.g., not digitally signed, and an archive file is loaded if the classes are digitally signed. It should be appreciated that the archive file has associated class files. As such, loading the archive file involves loading class files. After the class files are loaded into memory, a validation process is performed on the loaded files in a step 408. The validation process, which includes the process of verifying whether the header signature associated with a loaded archive file is valid, in the event that an archive file has been loaded, will be described below with reference to FIG. 5.

After the validation process, in a step 410, the class files are converted into an applet. That is, an applet is created in memory by instantiating the loaded class files, which may or may not be a part of a JAR file. Once the applet is created, the applet file is executed in a step 412. The steps associated with the execution of an applet will be described below with respect to FIG. 6.

Figure 5:
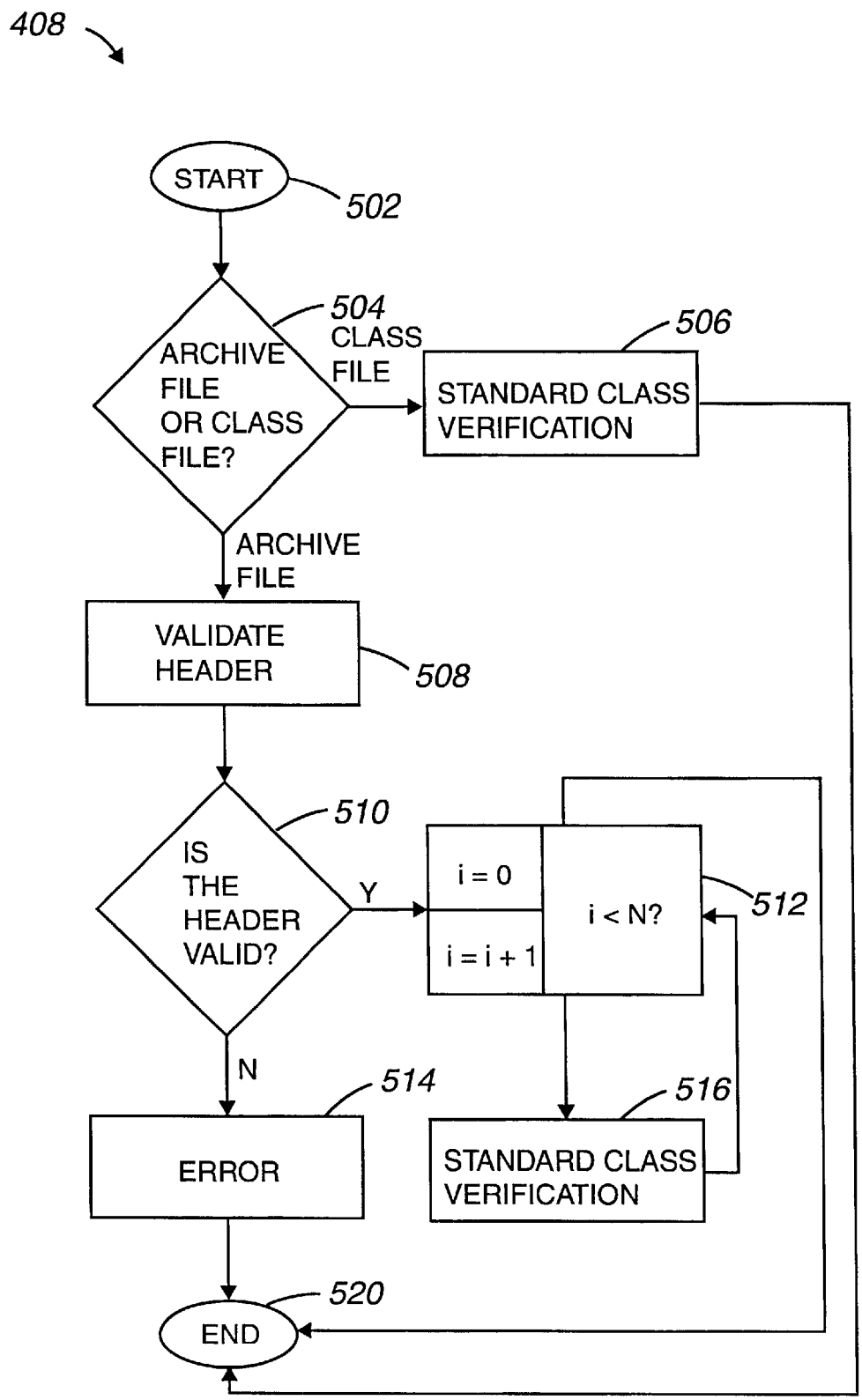
FIG. 5 is a process flow diagram which illustrates the steps associated with validating class files in accordance with an embodiment of the present invention.

FIG. 5 is a process flow diagram which illustrates the steps associated with validating class files, i.e., step 408 of FIG. 4, in accordance with an embodiment of the present invention. The process begins at step 502, and in a step 504, a determination is made regarding whether an archive file or a class file has been loaded. If a class file has been loaded, then process flow proceeds to a step 506 in which a standard class verification is performed. A standard class verification typically includes a check of all loaded class files and, therefore, classes, in order to ascertain whether anything in the class files may compromise security. In some embodiments, a check is made to determine if the security of a virtual machine, as for example a Java™ virtual machine, can be compromised. Standard class verification methods are generally well known to those of ordinary skill in the art. Once the standard class verification is performed, the process of validating the class files is completed at 520.

If the determination in step 504 is that an archive file has been loaded, then in a step 508, the header of the archive file is validated, or authenticated. The validation of the archive file generally involves an identification of the origin of the archive file based upon the header signature. That is, a check is made to establish the origin of the header signature and, therefore, the archive file. The validation may also include a check of whether data associated with the archive file is intact. It should be appreciated that in some embodiments, an archive file may not include a header signature. By way of example, an archive file within an intranet may not be signed. In a step 510, a determination is made as to whether the header is valid. If the header is not valid, e.g., the content of the archive does not correspond with the signature, then in a step 514, an error flag or the like is raised. In one embodiment, the error flag may result in an exception being thrown. In another embodiment, the error flag may result in a message being returned to the requesting client. After the error flag is raised, the process of validating class files ends at 520.

If the header is found to be valid in step 510, process flow moves from step 510 to a step 512 which is the determination of whether any classes associated with the archive file remain to be validated. If there is a class to be validated, then in a step 516, a standard class verification is performed. As previously described in step 506, a standard class verification includes a check of whether anything in a given class may compromise the security of a virtual machine. By way of example, the security of a virtual machine may be compromised if something in a given class can overwrite files or memory on the virtual machine. After the standard class verification is completed on the given class, process control returns to step 512 in which a determination is made regarding whether there are any more classes which are to be validated. Process control loops between steps 512 and 516 until a determination is made in step 512 that no more classes remain to be validated, at which point the process of validating class files is completed at 520.

Figure 6:
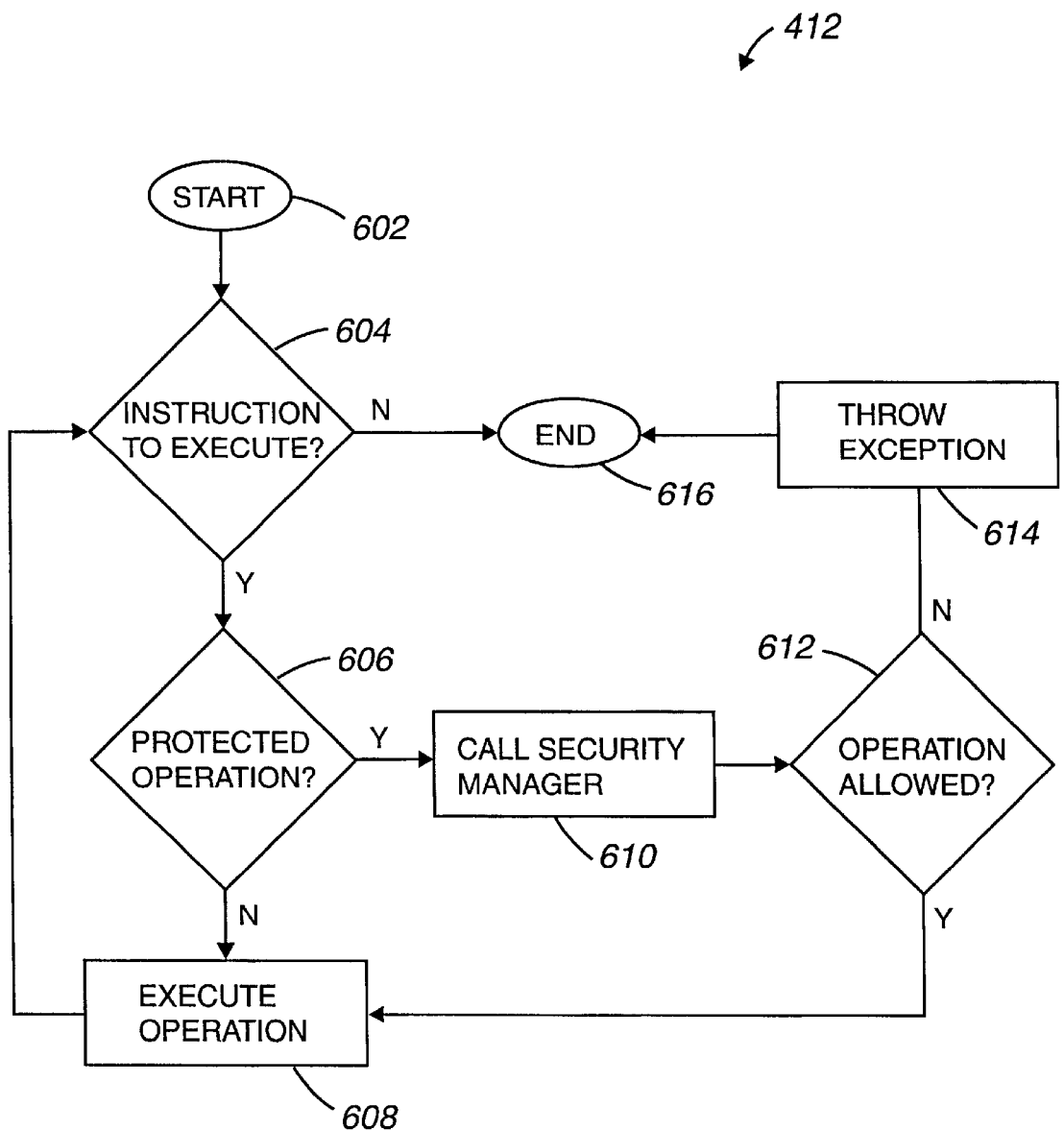
FIG. 6 is a process flow diagram which illustrates the steps associated with executing an applet in accordance with an embodiment of the present invention.

FIG. 6 is a process flow diagram which illustrates the steps associated with executing an applet in accordance with an embodiment of the present invention. That is, step 412 of FIG. 4 will be described. The process begins at 602, and, in a step 604, a determination is made as to whether the applet contains an instruction to execute an operation. The operation may generally be a call to access a system-level resource. If the applet does not contain an instruction to execute an operation, then the process of executing the applet ends at 616. If the applet does contain an instruction to execute an operation, then process flow proceeds to a step 606 in which it is determined whether the operation to be executed is a protected, e.g., secured, operation. That is, a determination is made regarding whether the operation is an operation to which access is controlled. If it is determined that the operation is not protected, then the operation is executed in a step 608, and process flow returns to step 604, which is the determination of whether there is an instruction to execute another operation.

If it is determined in step 606 that the operation in the instruction to execute is protected, then process flow moves to a step 610 in which the applet security manager is called. The process of calling the security manager will be described in more detail below with reference to FIG. 7. The applet security manager typically controls the operations which are accessible to given applets. In one embodiment, the applet security manager is a Java™ applet security manager. In a step 612, it is determined whether the operation is allowed. In other words, step 612 is the determination of whether the applet has access to the operation which is to be executed. If the operation is allowed, then the operation is executed in step 608. From step 608, process control returns to step 604 which is the determination of whether there is an instruction to execute another operation.

If the determination in step 612 is that the operation is not allowed, then an error condition occurs, which can be implemented by having an exception is thrown in step 614, and the process of executing the applet ends at 616. It should be appreciated that in some embodiments, the step of throwing an exception may involve calling a throw function. In other embodiments, the step of throwing an exception may involve transmitting an error message which may be displayed by a user agent that is associated with the requesting client. In still other embodiments, the error handling may cause an interaction with the user to occur in the form of asking whether the user approves the performance of the operation by the applet. In such embodiments, access files can possibly be updated to permanently record the response provided by the user.

Figure 7:
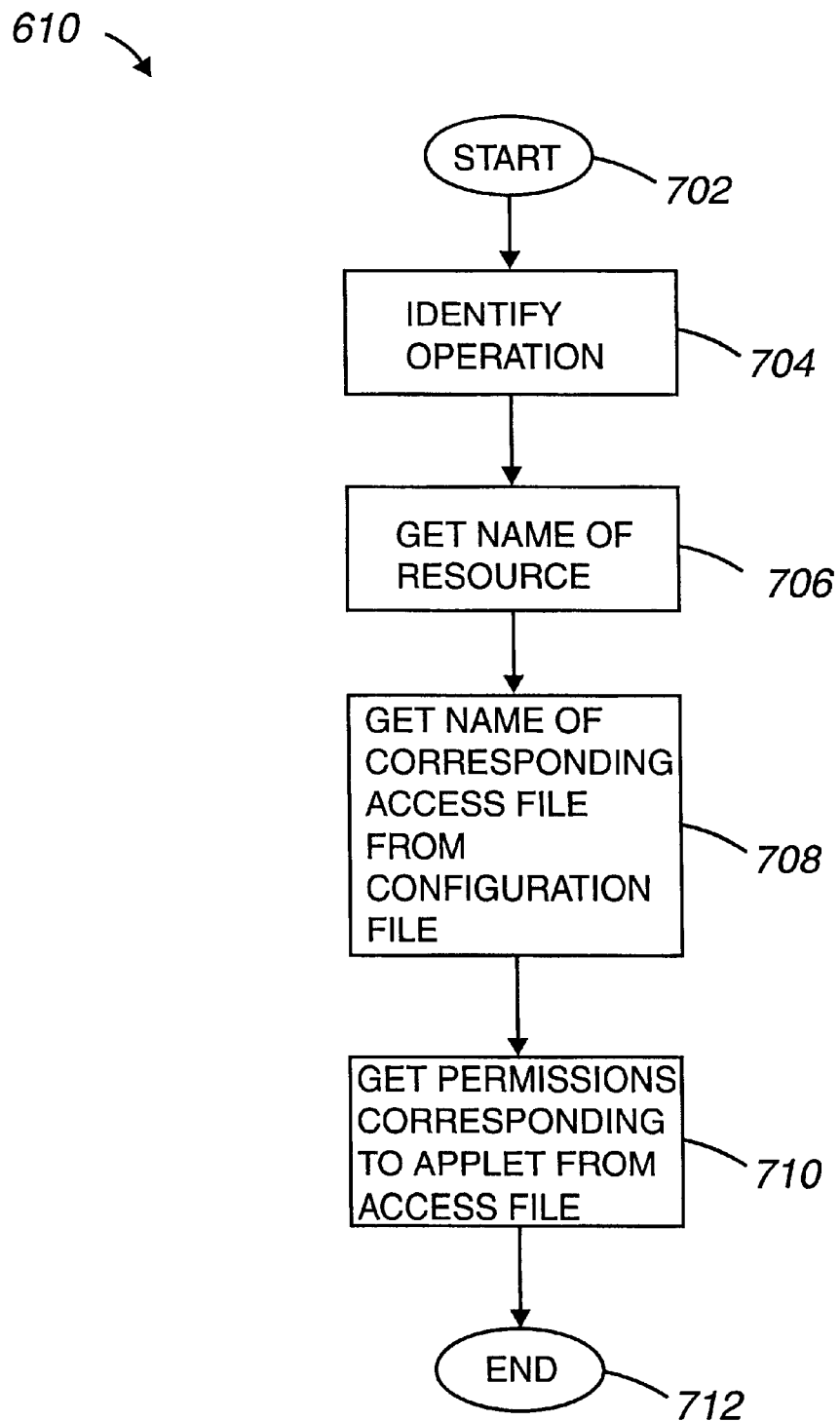
FIG. 7 is a process flow diagram which illustrates the steps associated with calling a security manager in accordance with an embodiment of the present invention.

Referring next to FIG. 7, the process of calling a security manager, i.e., step 610 of FIG. 6, will be described. It should be appreciated that a user agent generally has only one associated security manager. The process of calling a security manager begins at 702 and in a step 704, the operation which is being called by the applet is identified. Although the operation may be any one of a number of operations, the operation is generally a read operation or a write operation. From step 704, process flow proceeds to a step 706 in which the name of the resource associated with the operation is identified. In some embodiments, the name of the resource is passed into the call to the security manager and, hence, is readily identified. However, when the name of the resource is not passed into the call, the properties file, as previously described with respect to FIG. 3a, may be used to identify the associated resource.

Once the associated resource is identified in step 706, the name of the access file which corresponds to the resource is identified using the configuration file, which was described earlier with respect to FIG. 3b, that is associated with the applet. Permissions corresponding to the applet are then obtained from the access file in a step 710. It should be appreciated that in some embodiments, the appropriate access file may be a representation of the actual access file in memory. The access file, as described above with respect to FIG. 3c, associates individual hosts or groups with a set of permissions. After the permissions are obtained, the call to the security manager is completed at 712.

Figure 8:
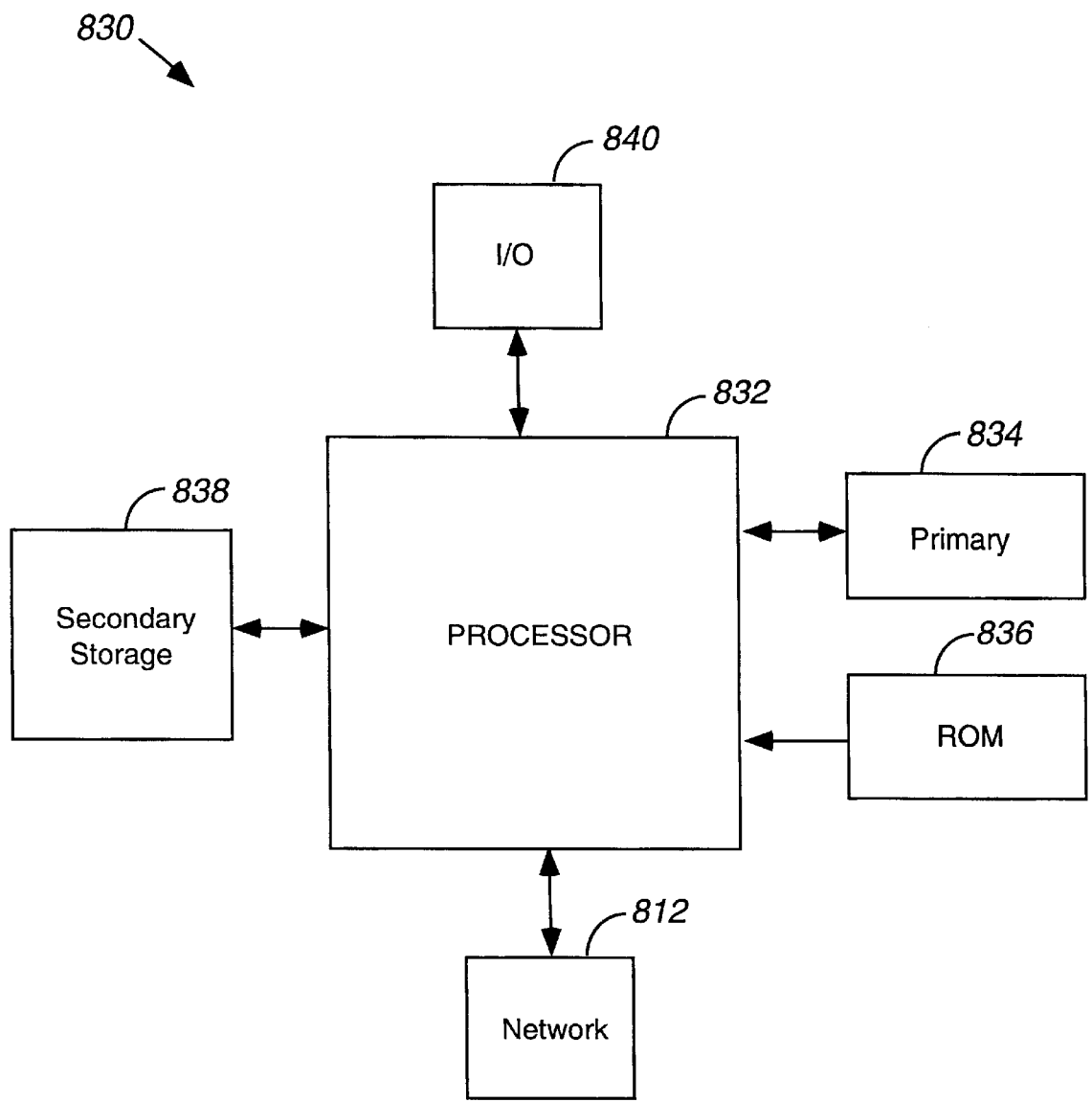
FIG. 8 is a diagrammatic representation of a computer system in accordance with the present invention.

FIG. 8 illustrates a typical computer system in accordance with the present invention. The computer system 830 includes any number of processors 832 (also referred to as central processing units, or CPUs) that is coupled to memory devices including primary storage devices 834 (typically a read only memory, or ROM) and primary storage devices 836 (typically a random access memory, or RAM). As is well known in the art, ROM 834 acts to transfer data and instructions uni-directionally to the CPU and RAM 836 is used typically to transfer data and instructions in a bi-directional manner. Both primary storage devices 834, 836 may include any suitable computer-readable media as described above. A mass memory device 838 is also coupled bi-directionally to CPU 832 and provides additional data storage capacity. The mass memory device 838 may be used to store programs, data and the like and is typically a secondary storage medium such as a hard disk that is slower than primary storage devices 834, 836. Mass memory storage device 838 may take the form of a magnetic or paper tape reader or some other well-known device. It will be appreciated that the information retained within the mass memory device 838, may, in appropriate cases, be incorporated in standard fashion as part of RAM 836 as virtual memory. A specific mass storage device such as a CD-ROM 834 may also pass data uni-directionally to the CPU.

CPU 832 is also coupled to one or more input/output devices 840 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known known input devices such as, of course, other computers. Finally, CPU 832 optionally may be coupled to a computer or telecommunications network, e.g., an Internet network or an intranet network, using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. Further, it should be appreciated by those skilled in the art that the above described hardware and software elements, as well as networking devices, are of standard design and construction (see, e.g., Herzog 1996).

The computer-implemented methods described herein can be implemented using techniques and apparatus that are well-known in the computer science arts for executing computer program instructions on computer systems. As used herein, the term "computer system" is defined to include a processing device (such as a central processing unit, CPU) for processing data and instructions that is coupled with one or more data storage devices for exchanging data and instructions with the processing unit, including, but not limited to, RAM, ROM, CD-ROM, hard disks, and the like. The data storage devices can be dedicated, i.e., coupled directly with the processing unit, or remote, i.e., coupled with the processing unit over a computer network. It should be appreciated that remote data storage devices coupled to a processing unit over a computer network can be capable of sending program instructions to a processing unit for execution on a particular workstation. In addition, the processing device can be coupled with one or more additional processing devices, either through the same physical structure (e.g., a parallel processor), or over a computer network (e.g., a distributed processor.). The use of such remotely coupled data storage devices and processors will be familiar to those of skill in the computer science arts (see, e.g., Ralston 1993). The term "computer network" as used herein is defined to include a set of communications channels interconnecting a set of computer systems that can communicate with each other. The communications channels can include transmission media such as, but not limited to, twisted pair wires, coaxial cable, optical fibers, satellite links, or digital microwave radio. The computer systems can be distributed over large, or "wide," areas (e.g., over tens, hundreds, or thousands of miles, WAN), or local area networks (e.g., over several feet to hundreds of feet, LAN). Furthermore, various local-area and wide-area networks can be combined to form aggregate networks of computer systems. One example of such a confederation of computer networks is the "Internet".

Although only a few embodiments of the present invention have been described, it should be understood that the present invention may be embodied in many other specific forms without departing from the spirit or the scope of the present invention. By way of example, although only one configuration of an archive file data structure which may be signed has been described, it should be appreciated that the archive file data structure may be widely varied within the scope of the present invention. Further, steps involved with a method of executing a request to access system resources may be reordered. Steps may also be removed or added without departing from the spirit or the scope of the present invention. Therefore the described embodiments should be taken as illustrative and not restrictive, and the invention should be defined by the following claims and their full scope of equivalents.

The following materials are incorporated herein by reference in their entirety and for all purposes.
1. Ralston, Anthony, and Reilly, Edwin D. 1993. *Encyclopedia of Computer Science*. Van Norstrand Reinhold.
2. Herzog, James H. 1996. *Design and Organization of Computing Structures*. Franklin, Beedle & Associates, Inc.
3. Stone, Harold S. 1983. *Microcomputer Interfacing*. Addison Wesley.
4. Martin, James, and Chapman, Kathleen K. 1989. *Local Area Networks: Architectures and Implementations*. Prentice Hall.
5. Flannagan, David. 1996. *Java in a Nutshell: A Desktop Quick Reference for Java Programmers*. O'Reilly & Associates, Inc.

What is claimed is:

1. A method for controlling the degree of access to operating system resources for a software program running on a first computer, wherein said first computer is running said operating system, the method comprising:

examining at least one file associated with said software program to determine the degree of system-level access available to said software program when said software program is being executed by said first computer, wherein the software program is constructed using said at least one file;

executing said software program on said first computer;

intercepting a program instruction associated with said software program while said software program is being executed on said first computer;

determining when said program instruction includes an operation that is outside said degree of system-level access available to said software program; and executing said program instruction when it is determined that said software program has permission to access system-level resources that are within said degree of system-level access available to said software program.

2. A method as recited in claim 1 further including defining said degree of access to said operating system resources for said software program.

3. A method as recited in claim 1 wherein determining when said program instruction includes an operation that is outside said degree of system-level access available to said software program includes validating an identifier associated with said software program.

4. A method as recited in claim 1 wherein executing said program instruction includes determining when said system-level resources being accessed by said program instruction are protected system-level resources.

5. A method as recited in claim 1 wherein said software program comprises an applet.

6. A method as recited in claim 4 wherein said applet is a Java applet.

7. A method as recited in claim 4 wherein said applet is associated with a header, said header being arranged to include an identifier, said identifier being arranged to identify said an origin of said file.

8. A method as recited in claim 7 further including validating said identifier to determine when said first computer has permission to access said system-level resources.

9. A method as recited in claim 8 wherein said first computer is a client computer and said applet is downloaded to said client computer from a server computer.

10. A method as recited in claim 9 wherein:

examining said at least one file includes determining the degree of system-level access to said server that is available to said applet when said applet is being executed by said client computer as defined by said defining a degree of access to said system-level resources associated with said server computer for said applet;

determining when the program instruction includes said operation that is outside said degree of system-level access available to the software program includes determining when said program instruction to access system-level resources associated with said server computer includes an operation that is outside said degree of system-level access available to said applet; and executing said program instruction includes executing said program instruction to access system-level resources associated with said server computer when it is determined that said applet has permission to access system-level resources associated with said server computer that are within the degree of system-level access available to said applet.

11. A method as recited in claim 10 including loading at least one file including program instructions to access system-level resources associated with said server computer by transmitting said at least one file including program instructions to access system-level resources associated with said second computer from said server computer to said first computer across said computer network.

12. A method as recited in claim 1 wherein at least some of said operating system resources reside on a second computer coupled with said first computer through a computer network.

13. A method as recited in claim 12 further including loading at least one file including instructions for executing said software program on said first computer.

14. A method as recited in claim 13 wherein said software program comprises an applet.

15. A method as recited in claim 14 wherein said applet is a Java applet, said Java applet being arranged to include a header, said header being arranged to include an identifier, said identifier being arranged to identify said first computer.

16. A method as recited in claim 15 further including validating said identifier to determine when said first computer has permission to access said system-level resources residing on said server computer.

17. A method as recited in claim 12 further including
calling a third computer to initiate a download of files from said third computer to said first computer;
loading said relevant files from said second server, said relevant files including an archive file, said archive file including at least one class file and a header, said header including an identifier arranged to indicate the origin of said archive file;
validating said archive file;
converting said class file into an applet; and
executing said applet, said applet including at least one instruction, wherein executing said applet enables said client to access said system resource associated with said first server.

18. A method for processing a request as recited in claim 17 wherein said step of executing said applet includes:
determining whether said instruction is an instruction to execute a protected operation;
executing said operation when it is determined that said instruction is not an instruction to execute a protected operation; and
determining whether said operation is allowed when it is determined that said instruction is an instruction to execute a protected operation.

19. A method for processing a request as recited in claim 18 further including calling a security manager when it is determined that said instruction is an instruction to execute a protected operation.

20. A method for processing a request as recited in claim 19 further including:
determining whether said operation is allowed;
executing the operation when it is determined that said operation is allowed; and
signaling an error when it is determined that said operation is not allowed.

21. A method for processing a request as recited in claim 20, wherein calling a security manager includes:
obtaining a name of said system resource;
using said name of said system resource to obtain a name of an access file which corresponds to said system resource; and
obtaining permissions corresponding to said applet from said access file.

22. A method for processing a request as recited in claim 21 wherein said archive file is a Java archive file.

23. A method for processing a request as recited in claim 22 wherein said Java archive file includes a data block which contains information associated with said Java archive file.

24. A computer system for controlling the degree of access to operating system resources comprising:
a first computer coupled with at least one memory device which holds therein at least one file including instructions for executing a software program, said software program running on said first computer, said first computer running said operating system, said first computer being configured to:
define said degree of access to said operating system resources for said software program;
load said at least one file, said at least one file including instructions for executing said software program on said first computer;
examine said at least one file to determine the degree of system-level access available to said software program when said software program is being executed by said first computer;
execute said software program on said first computer;
intercept a program instruction associated with said software program when said software program is being executed on said first computer;
determine when said program instruction includes an operation that is outside said degree of system-level access available to said software program; and
execute said program instruction when it is determined that said software program has permission to access system-level resources associated with said first computer that are within the degree of system-level access available to said software program.

25. A computer system according to claim 24 wherein said first computer is arranged to validate an identifier associated with said software program.

26. A computer system according to claim 24 wherein said first computer is arranged to determine if said system-level resources being accessed by said program instruction are protected system-level resources.

27. A computer system according to claim 24 wherein said software program comprises an applet.

28. A computer system according to claim 27 wherein said applet is a Java applet.

29. A computer system according to claim 28 wherein said applet is associated with a header, said header being arranged to include an identifier, said identifier being arranged to identify a creator of said identifier.

30. A computer system according to claim 29 wherein said first computer is arranged to verify said identifier to determine if said first computer has permission to access said system-level resources.

31. A computer-readable medium comprising computer-readable program code devices configured to cause a computer to perform the computer-implemented actions of:
defining said degree of access to said operating system resources for said software program;
examining at least one file to determine the degree of system-level access available to said software program when said software program is being executed by said computer, said at least one file being associated with said software program, wherein said at least one file includes instructions for executing said software program on said computer;
executing said software program on said computer;
intercepting a program instruction associated with said software program when said software program is being executed on said computer;
determining if said program instruction includes an operation that is outside said degree of system-level access available to said software program; and
executing said program instruction when it is determined that said software program has permission to access system-level resources associated with said computer that are within the degree of system-level access available to said software program.

32. A computer readable medium comprising computer-readable program code devices according to claim 31 wherein said computer-readable program code devices are configured to determine when said program instruction includes an operation that is outside said degree of system-level access available to said software program are arranged to validate an identifier associated with said software program.

33. A computer readable medium comprising computer-readable program code devices according to claim 31 wherein said computer-readable code devices are configured to execute said program instruction are arranged to determine when said system-level resources being accessed by said program instruction are protected system-level resources.

34. A computer readable medium comprising computer-readable program code according to claim 31 wherein said software program comprises an applet.

35. A computer readable medium comprising computer-readable program code according to claim 34 wherein said applet is a Java™ applet.

36. A computer readable medium comprising computer-readable program code according to claim 34 wherein said applet is associated with a header, said header being arranged to include an identifier, said identifier being arranged to identify a creator of said identifier, and said computer-readable program code devices are configured to perform the action of validating said identifier to determine if said applet has permission to access said system-level resources.

* * * * *